United States Patent [19]

Zeigler

[11] Patent Number: 4,866,147
[45] Date of Patent: Sep. 12, 1989

[54] SOLUBLE SILYLATED POLYACETYLENE DERIVATIVES AND THEIR USE AS PERCURSORS TO NOVEL POLYACETYLENE-TYPE POLYMERS

[75] Inventor: John M. Zeigler, Albuquerque, N. Mex.

[73] Assignee: The United States of America as represented by the United States Department of Energy, Washington, D.C.

[21] Appl. No.: 909,801

[22] Filed: Sep. 22, 1986

Related U.S. Application Data

[63] Continuation-in-part of Ser. No. 760,433, Jul. 30, 1985, abandoned.

[51] Int. Cl.$^4$ .................... C08F 28/06; C08F 130/08; C08F 230/08
[52] U.S. Cl. ................... 526/256; 526/258; 526/266; 526/274
[58] Field of Search ........... 526/279, 256, 258, 266, 526/286

[56] References Cited

U.S. PATENT DOCUMENTS 4,410,640 10/1983 Kobayashi et al. .............. 521/63
4,591,440 5/1986 Higashimura et al. ............ 210/640
4,607,088 8/1986 Nomura et al. ................. 526/279

FOREIGN PATENT DOCUMENTS 8301905 6/1983 World Int. Prop. O. .

OTHER PUBLICATIONS

J. Am. Chem. Soc., 1983, 105, pp. 7473–7474, Dec. 13, 1983.
Ikano et al., Trans. of Polymer Preprint, Japan, vol. 31, No. 6, pp. 1189–1192.
Acc. Chem. Res., 1984, vol. 17, pp. 51–56, Mosuda et al.

*Primary Examiner*—Joseph L. Schofer
*Assistant Examiner*—Peter F. Kulkosky
*Attorney, Agent, or Firm*—Armand McMillan; James H. Chafin; Judson R. Hightower

[57] ABSTRACT

Polymerization of acetylenic monomers is achieved by using a catalyst which is the reaction product of a tungsten compound and a reducing agent effective to reduce W(VI) to W(III and/or IV), e.g., WCl$_6$·(organo-Li, organo-Mg or polysilane). The resultant silylated polymers are of heretofore unachievable high molecular weight and can be used as precursors to a wide variety of new acetylenic polymers by application of substitution reactions.

5 Claims, No Drawings

SOLUBLE SILYLATED POLYACETYLENE DERIVATIVES AND THEIR USE AS PERCURSORS TO NOVEL POLYACETYLENE-TYPE POLYMERS

The U.S. Government has rights in this invention pursuant to Contract No. DE-AC04-76DP00789 between the U.S. Department of Energy and AT&T Technologies, Inc.

This application is a continuation-in-part of application Ser. No. 760,433 filed July 30, 1985 now abandoned.

BACKGROUND OF THE INVENTION

Doped polyacetylene, $(CH)_x$, has generated a great deal of interest as an electrode material for low cost, lightweight organic batteries with potential for high power densities. See, e.g., MacDiarmid et al., *Nato Conf. Ser., Molec. Met.*, 6 (1), 161 (1982); Chiang, *Polymer*, 22, 1454 (1981); P. J. Nigrey et al., *J. Electrochem. Soc.*, 129, 1270 (1982); T. Nagatomo et al., *Jap. J. Appl. Phys.*, 22, L275 (1983); R. H. Baughman et al., *Chem. Rev.*, 82, 209 (1982); J. Simionescu et al., *Prog. Polym. Sci.*, 8, 133 (1982); and Masuda et al., *Acct. Chem. Res.*, 17, 51 (1984); which disclosures are incorporated by reference herein. While polyacetylene can be doped to a metallic state ($-1200$ S/cm), its intractability, $O_2$ sensitivity, and long-term instability pose severe problems in processing the material on a commercial scale.

In programs of synthesis directed toward conductive materials having improved stability and processibility, polyacetylene derivatives have been prepared, e.g., poly-(trimethylsilylacetylene) (PTMSA) $—C(Si(CH_3)_3)=CH)—$. PTMSA has been reported previously (MW 10000), Okano et al., *Polym. Preprints Jap.*, 31, 1189 (1982), or its duplicate *J. Polym. Sci., Polym. Chem. Ed.*, 22, 1603 (1984); Voronkov et al., *J. Polym. Sci., Polym. Chem. Ed.*, 18, 53 (1980); and WO 8301905 A1 (9/6/83) to Mitsubishi Chemical Ind. Co., Ltd, *Chem. Abs.*, 99: 159660f. However, polymers of high molecular weights were not obtained using the methods and catalysts of the prior art.

A large number of catalyst systems were surveyed in this work for activity in polymerization of trimethylsilylacetylene, a commercially available compound. Of the wide variety of previously known alkyne polymerization catalysts evaluated, only the tungsten-based catalysts, $WCl_6.Ph_4Sn$ used by the prior art and $(W(CO)_6/hr/CCl_4)$, gave significant amounts of PTMSA. These were not, however, satisfactory in all respects. The preparation of soluble PTMSA with $WCl_6.Ph_4Sn$ and $(W(CO)_6/CCl_4/hr)$ suffered from low and irreproducible conversions, particularly in large scale (10 g) runs. Attempts to increase conversion by use of additional catalyst aliquots were only marginally successful. See the last two entries in Table 1. It proved difficult to separate the resulting polymer from catalyst residues and Sn by-products. Okano et al. and this work were unable despite several attempts, to duplicate the results of Voronkov et al., that PTMSA can be obtained using $MoCl_5$ as a catalyst. Their procedure yields only low molecular weight liquid oligomers of TMSA, which are of no value for conductive polymer applications.

These difficulties, as well as the large amount of insoluble material formed in previous approaches, spurred efforts to develop improved methods of PTMSA synthesis.

In this regard, methods for preparing a variety of other related polymers are also inapplicable to the problem of polymerizing TMSA and related monomers and/or comonomers to the high molecular weights desirable for important applications. For example, U.S. Pat. No. 3,198,766 employs a combination of metallic catalysts in the polymerization of unsaturated organic compounds including acetylene with organosilicon compounds containing at least one Si—H bond. U.S. Pat. Nos. 3,699,140 and 3,758,541 involve the preparation of organosilicon compounds containing acetylenic unsaturation. U.S. Pat. No. 3,878,263 involves the preparation of acrylate-functional polysiloxane polymers. U.S. Pat. No. 4,472,562 relates to stabilized polyorganosiloxane compositions.

The catalyst $WCl_6+n-RLi$, per se, is known, e.g., for metathetic cycloolefin polymerization. See, e.g., B. A. Dolgoplosk, et al., *Eur. Polym. J.*, 15, 237 (1979). However, this catalyst has never before been used for polymerization of acetylenic compounds.

SUMMARY OF THE INVENTION

Accordingly, it is an object of this invention to provide a new method for preparing silylated polyacetylenes having desired properties, e.g., for use as dopable organic polymers, using a controllable reaction.

It is another object of this invention to provide a process for preparing such polymers which can be used as intermediates in the preparation of other polyacetylenic derivatives.

It is another object of this invention to provide these polymers per se as well as various derivatives which can be prepared therefrom.

Upon further study of the specification and appended claims, further objects and advantages of this invention will become apparent to those skilled in the art.

These objects have been attained by providing a process for preparing a polyacetylenic polymer comprising polymerizing an acetylenic monomer in the presence of an effective catalyst which is the product of a tungsten (III to VI) compound and, as a cocatalyst, a reducing agent capable of reducing tungsten VI to tungsten III and/or IV, with the proviso that the cocatalyst is not an organo-Sn compound.

They have further been achieved by providing such a process wherein at least one acetylenic monomer is of the formula $R—C≡R_4$, wherein R is $R_1R_2R_3Si$ in which each of $R_1$, $R_2$, and $R_3$ is $C_{1-4}$(n- or sec-)alkyl, $C_{2-4}$-alkenyl, $C_{6-14}$-aryl, $C_{7-17}$-heteroaryl, $C_{7-17}$-alkaryl, $C_{7-17}$-aralkyl, $C_{3-12}$-cycloalkyl, $C_{2-4}$-(n- or sec-)-alkyl wherein one $CH_2$ group is replaced by —O—, —S—, —COO—, or —OOC—; and $C_{6-14}$-aryl or heteroaryl in which one aryl CH is substituted by —O—, —S—, —COO—, or —OOC—; H, or groups recited for $R_1$, $R_2$, and $R_3$; $R_4$ is H or one of the groups recited for $R_1$, $R_2$, and $R_3$ except $C_{2-4}$-alkenyl, with the provisos that R and $R_4$ must not both be H at the same time and that the combination of R and $R_4$ be sterically compatible with said polymerication.

They have also been achieved by providing the resultant polymers per se, e.g., as prepared by the process of this invention. An especially preferred polymer is polytrimethylsilylacetylene.

These objects have additionally been achieved by providing a process of preparing a copolymer containing repeating units of $—(XC=CR_4)—$, and $—(C(Si(CH_3)_3)=CH)—$ in varying proportions. comprising reacting a silyl polymer prepared by this invention with a reagent effective to cause partial substitution of $R^1R_2R_3Si$-groups thereof by X—, and, optionally preparing a polymer having repeating units of —(YC=CR$_4$)— comprising performing the substitution process above and then reacting the resultant —(XC=CR$_4$)—-containing polymer with a reagent effective to cause substitution of X-groups thereof by Y-. A further object is to provide copolymers having silyl substituents, a group X as defined above, and a group Z by sequential replacement of the PTMSA silyl groups.

DETAILED DISCUSSION

A primary feature of the process of this invention is the utilization of a catalyst heretofore not used in conjunction with polyacetylene-type polymerizations. Using the catalysts of this invention, polymers are achieved—in higher yields—and with controllability of microstructure which were heretofore not available. These polymers also have very high molecular weights, e.g., greater than 10,000 or 30,000 and more, up to weights on the order of $10^6$. These are number average molecular weights as conventionally measured by gel permeation chromatography in conjunction with a conventional polystyrene standard. The polymers have high solubility in common organic solvents, e.g., hydrocarbons, e.g., toluene, xylenes, etc., chlorinated hydrocarbons, THF, etc., and others as are well known. They have low $O_2$ sensitivity and can be conventionally doped to desired conductive or semiconductive states (e.g., using iodine vapor). Doping is conventionally reversible to states of lower conductivity or to insulating states.

The polymers of this invention (especially PTMSA) are particularly useful in that their silyl substituents can be replaced to yield other polyacetylene derivatives including those not readily available by direct polymerization. By appropriately selected single or sequential substitution reactions, a wide range of novel substituted polyacetylene-type polymers can rapidly be generated having highly desirable properties, e.g., which make them of unique interest as electrically conductive organic polymers for uses, e.g., as electrodes in batteries having high power densities, EMP protection, hybrid microcircuits, electrophotography, gas separation, etc. Details of these uses are described in the literature, including several of the references cited above.

The catalyst employed in this invention is provided in the active form by reactively combining two components, i.e., a tungsten compound wherein the tungsten valence state is III to VI and a co-catalytic reducing agent having a reducing power effective for reducing tungsten VI to tungsten III and/or IV. This particular combination has heretofore been employed for catalysis of other reactions but never for acetylenic polymerizations. See, supra. Prior art catalysts which have been employed in conjunction with polyacetylene-type polymerizations have been composed of the tungsten component of this invention but the prior art reducing agents (e.g., organo-Sn compounds) were ineffective to satisfactorily reduce tungsten VI to tungsten III or IV and produced reactions having many undesirable features. Consequently, the unique properties of the polymers and the polymerizations of this invention were never achieved. These prior art catalyst combinations are, consequently, excluded from the scope of this invention and include combinations of tungsten hexachloride with tetrabutyl tin, tetramethyl tin and tetraphenyl tin. Cocatalysts such as Et$_3$SiH and Ph$_2$SiH$_2$ are also excluded alone or in combination with the foregoing prior art cocatalysts. Thus, in general, tetraalkyl tin and organosilane cocatalysts are ineffective in accordance with this invention.

It is believed that the active catalytic species of the process of this invention is tungsten IV alone or in combination with tungsten III. This theory, of course, is not intended to limit the scope of the invention as described herein. Accordingly, it is conceivable that tungsten III or tungsten IV compounds which have sufficient stability and handlability could be used per se as catalysts in accordance with this invention. However, it is greatly preferred that the more readily available and stable form of catalyst be used wherein the tungsten component described above is reduced in situ by the cocatalyst described above.

In general, the tungsten component and the cocatalyst are first combined and reacted to form the reduced form of tungsten, e.g., at $-70°$ C. to $150°$ C., preferably and under an inert atmosphere under anhydrous conditions. The resultant active catalyst is then added, preferably dropwise, to a solution of the monomer under conditions described more fully below. However, this order of operation is not absolutely necessary. It is possible to add one catalytic component to the monomer solution and then to initiate the polymerization by addition of the other component. It is also possible to add the monomer to the active catalyst solution, etc.

Preferred as tungsten compounds are tungsten VI compounds with common anions, preferably inorganic anions forming stable and inexpensive tungsten salts. The preferred compounds are the tungsten hexahalides (F, Cl, Br, I), most preferably the readily available tungsten hexachloride. Salts of mixed anions are also suitable.

The preferred cocatalysts are organo-lithium compounds, organo-magnesium compounds (Grignard reagents: RMgX) and polysilanes. The organo portion of the organometallic compounds is not critical and any of the conventional aliphatic and aromatic groups utilized in such compounds are applicable. Typical such organo groups include alkyl groups, e.g., methyl, ethyl, propyl, etc. and phenyl groups.

Another preferred class of cocatalysts is that of the polysilanes, i.e., polymers having Si—Si bonds. The high, linear polysilane polymers can be utilized. e.g., those disclosed in U.S. Pat. No. 4,588,801, issued on May 13, 1986, which is incorporated by reference herein. Also utilizable are the cyclic polysilanes, typically having 4–7 ring atoms, many of which are commercially available. These polysilanes are particularly active cocatalysts.

Similarly utilizable are compounds having metal-metal bonds which provide the reducing power compounds include those having Si—Si, P—P, S—S, Ge—Ge, As—As, Se—Se, Sn—Sn, Sb—Sb or Te—Te bonds.

The amount of catalyst utilized is not critical. Typically, from 0.001 to 10 stoichiometric equivalents can be used. Preferably, about 0.03 of a stoichiometric equivalent is utilized. The particular form of the active catalyst is also not critical. They can be used as prepared from the components themselves. It is also possible to fix one of the catalytic components on a conventional carrier such as silica, alumina, etc., thereby preparing a surface active catalyst.

The ratio of co-catalyst reducing agent component to tungsten component can be varied over a wide range. This ratio will have an impact on the catalyst's activity and the resultant properties of the polymer, including molecular weight and solubility. Consequently, in addition to selection of cocatalyst structure per se, variation of the ratio of the amount of cocatalyst to the amount of tungsten component can be used to control and predetermine the properties of the polymer in conjunction with routine preliminary orientation experiments.

The ratio of the amount of cocatalyst to the amount of tungsten catalyst will generally be selected in the range of about 0.01 to 6 equivalents of cocatalyst based on the amount of catalyst. In general, catalytic activity will peak at a molar ratio of cocatalyst to catalyst of about 4, the precise peak in activity being routinely determinable in a given case by conventional orientation experiments. This activity peak will correspond to the molar ratio at which the highest relative amount of the most active form of reduced tungsten is obtained. This form is presently theorized to be tungsten IV.

In general, as the molar ratio of cocatalyst to catalyst is increased, the molecular weight of the resultant polymer will increase and the solubility of the resultant polymer will decrease. Consequently, the ratio will be selected in accordance with the desired combination of molecular weight and/or solubility properties necessary for the contemplated end-use. Again, optimum ratios in this regard can be routinely determined with a few preliminary orientation experiments.

For example, where the silylated polymer is to be used directly for the contemplated purpose, it may be desired to optimize solubility at the expense of somewhat lower molecular weights. On the other hand, where the silylated polymer is to be used as a precursor to other polymers based on replaced silyl groups, solubility of the silyl polymer per se will be less important. This is based on the observation that the non-soluble polymer obtained in the process of this invention has been shown to be insoluble not because of crosslinking, but rather because of the geometric structure of the polymer itself. Experiments have shown that the non-soluble polymer is readily solubilized by bromine reaction, i.e., as a result of replacement of some of the silyl groups with solubilizing Br groups. The solubilized material and the original soluble fraction have exactly the same molecular weight distribution. However, the insoluble fraction backbone is relatively enriched in the trans-double bond isomer with respect to the cis-double bond isomer. The ratio of cocatalyst to catalyst, consequently, exercises control of the solubility by controlling double bond geometry. This provides a significant advantage not achievable in prior art systems.

A wide range of monomers and comonomers can be polymerized in accordance with this invention. In general, any combination of monomers of the formula $RR'R''SiC{\equiv}CR'''$ can be used. The $R$—$R'''$ groups must be selected so that the resultant stereochemistry is not too stringent for the polymerization to proceed. Again, routine orientation experiments can be utilized in borderline cases in order to determine applicable and inapplicable structural combinations. Generally, any reaction compatible aliphatic or aromatic, hydrocarbon or heterocyclic moieties can be used.

Suitable groups on the silyl portion of the monomers and polymers of this invention include alkyl groups of 1–4 (or more, e.g., 8 or 10, etc.) C atoms, e.g., methyl, ethyl, n-propyl, isopropyl, n-butyl, sec-butyl, etc. t-Butyl will not be applicable in most cases because of steric hindrance effects. The crrresponding unsaturated aliphatic groups are also utilizable. Suitable aryl groups include phenyl, naphthyl, the tri-phenyls, etc. The corresponding alkaryl and aralkyl groups can also be utilized, e.g., benzyl. Cycloalkyl groups are also appropriate, including cyclobutyl, cyclopentyl, cyclohexyl, etc.

Methylene groups in the mentioned alkyl groups can also be replaced by —O—, —S—, —COO—, or —OOC—. The aryl groups can be substituted, especially 4-substituted by conventional electron releasing groups or even groups having neutral electronic effects. Many other related silyl substituents can be equivalently employed.

Suitable $R^4$ groups on the monomer include hydrogen and the same groups mentioned above as silyl substituents except that the alkenyl groups are not employable since they form conjugated systems with the acetylenic bond of the monomer.

As mentioned, the combination of these groups on the monomers must be selected so that the resulting stereochemistry is compatible with the polymerization of this invention. For example, in some cases it may not be possible to have more than two cycloaliphatic rings on the silyl groups and, generally, bis-silyl monomers will not be suitable.

In general, the reaction of this invention will not be significantly affected by the precise structure of the monomers being polymerized. The wide variation in suitable monomeric structures is a major advantage for this invention since it permits control of the solubility properties of the resultant polymers via control of the hydrophilicity/hydrophobicity properties imparted by the silyl groups in accordance with conventional considerations. This results from the fact that silyl groups remain in the polymers of this invention even when the primary silylated acetylenic polymer is subsequently reacted to replace some of the silyl groups by other desired substituents.

It is possible to prepare homopolymers of single monomers of copolymers of the mentioned monomers with each other or with other acetylenic monomers, including acetylene itself. All of these starting material monomers are known, and in some cases commercially available, or can be conventionally prepared from known starting materials using known reactions.

The polymerization reaction of this invention can be carried out over a wide range of reaction conditions. Suitable temperatures include −10° C. to 150° C., preferably 25° C.–100° C. The reactions are very preferably carried out under inert atmospheres and anhydrous conditions since the reaction is sensitive to oxygen and water. Typically, nitrogen or argon atmospheres are used. Conversions are high, e.g., 85–100% and yields are typically 100% based on these conversions. Typical times for complete conversion are in the range of less than about 1 minute up to about 48 hours in dependence upon the reaction conditions, primarily the cocatalyst. For example, using polysilanes as cocatalysts, very short reaction times on the order of 1 minute or less are achieved. As previously noted, any order of addition is possible; however, dropwise addition of the active catalyst to a solution of the monomer is preferred, especially when the highest molecular weights are desired. Suitable solvents for conductance of the reaction include the same solvents mentioned above with respect to the solubility of the resultant polymers, e.g., hydrocarbons, chlorinated hydrocarbons, preferably aromatic, alkanes being less effective as solubilizing agents, ethers (e.g., THF), and, generally, any reaction compatible solvents. In general, there is no significant effect of the reaction conditions on the nature of the resultant polymer unless the solvent interreacts with the polymer, e.g., as in the case of THF. Workup of the product polymers is fully conventional as exemplified below.

A significant aspect of this invention is the enablement of the preparation of polymers having molecular weights of about 30,000 and higher. The weight of 30,000 is in the approximate region wherein polymeric chains begin to entangle and non-Neutonian flow is observed. As a result, such polymers are excellent film formers and are highly applicable to a wide variety of end uses. Polymers of molecular weights significantly less than 30,000 are not as preferred in this regard, tending to have insufficient toughness and higher crystallinity. Polymers in accordance with this invention can be prepared with molecular weights up to 500,000 and higher, e.g., on the order of $10^6$. Typically, molecular weight distributions peak in the range of 50,000–100,000. However, it is important to note that previously unattained molecular weights of, e.g., 10,000, 15,000, 20,000, 25,000, 30,000, 35,000, etc., can now be achieved, in accordance with this invention, in soluble polymers.

The polymeric products of this invention are all useful per se as conductive organic polymers for the purposes mentioned above and well known in the literature. However, a particularly preferred use of the silylated polymers of this invention involves their employment as precursors to other acetylenic polymers. This use involves the application of conventional nucleophilic or electrophilic substitution reactions whereby silyl groups on the polymers prepared directly in accordance with this invention are replaced by other groups, e.g., halides, hydrogen, acyl groups, e.g., benzoyl, acetyl and other alkanoyl groups, etc. Conventional halogenating agents are applicable, including $CF_3OF$ for fluoride substitution. Conventional acylating agents are also applicable, e.g., acyl chlorides such as benzoyl chloride or acetyl chloride/$TiCl_4$/$CH_2Cl_2$. For replacement of silyl groups by hydrogen atoms, $Et_4N^+F^-$ or $n-BuN^+F^-$ or related reagents can be utilized. Deuterium can be incorporated by use of deuterated solvents. Sequential substitution reactions can also be utilized, thereby significantly expanding the scope of polymers preparable using the polymers of this invention as precursors.

Suitable conditions for carrying out the large body of applicable reactions can be selected in accordance with conventional considerations. Essentially, these are the same as for the corresponding substitution reactions carried out in the prior art. Suitable solvents will include those mentioned above and also polar solvents compatible with the underlying substitution reaction, preferably aprotic polar solvents, e.g., N-methylpyrrolidone, DMF, etc., or polar solvents, e.g., $H_2O$, $D_2O$, etc.

In general, less than 100% desilation will occur in these reactions. Typically, desilations on the without concomitant side reactions. Desilations up to 95% have also been achieved. Desilation degree can be controlled by suitable control of reaction conditions. Generaly, as temperature increases, %-desilation increases. As Friedl Craft catalytic activity increases, electrophilic desilation degree increases. Similarly, the usual solvent effects encountered in ionic reactions will play their normal role here.

As mentioned, the polymers per se of this invention as well as those preparable therefrom by substitution reactions are all employable as dopable conductive or semiconductive organic polymers, e.g., as dopable dielectrics, e.g., cast as films for any of the previously mentioned purposes or other known purposes, e.g., as interconnects in microelectronic circuitry, as antistatic agents, as replacements for conventional polymers loaded with silicon or carbon for conductivity enhancement, etc. The dopability aspect of the polymers of this invention is fully conventional and can be achieved utilizing the prior art methods employed in conjunction with polyacetylene and related polymers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Poly(trimethylsilylacetylene) (Inverse Addition).

To a solution of $WCl_6$ (2.85 g, 7.20 mmol) in 90 ml of toluene was added 4.23 ml of 1.7M PhLi solution (7.20 mmol) in a single portion. The resulting dark red-brown mixture was allowed to stir for 30 minutes and then transferred to a dropping funnel. The catalyst solution was added dropwise to a solution of 20.85 g (212 mmol) trimethylsilylacetylene in 120 ml toluene over a period of 30 minutes. After stirring for 16 hours at 23° C., an aliquot of the solution analyzed by proton NMR showed conversion to be essentially complete. The viscous reaction mixture was diluted with eight volumes of methanol and the resulting dark yellow precipitate collected by filtration, to yield 16 g of crude PTMSA after drying in vacuo. The crude polymer was slurried in toluene and gelatinous insoluble polymer separated by filtration through filter aid. Treatment of the filtrate with five volumes of methanol afforded purified PTMSA. Two more precipitations from toluene/methanol and THF/methanol gave 4.5 g of analytically pure soluble PTMSA as a yellow solid. IR (KBr): UV (THF): $\lambda_{max}292$ ($\epsilon 3000$), $\lambda_{max}250$ ($\epsilon 3000$); $^1HNMR(CDCl_3)\delta$(rel. to TMS internal standard) 0.1 (br.s., 9H, $Si(CH_3)_3$6.6(br.s., 1H, olefinic H); $^{13}CNMR(CDCl_3)$.

EXAMPLE 2

Fluoride-Induced Desilation of PTMSA.

A solution of 200 mg (2 mmol) of PTMSA in dry THF containing 1.5 eq. $H_2O$ was stirred at room temperature with 800 mg (3.0 mmol) $(n-Bu)_4N^+F^-$. An immediate dark blue-green color developed and persisted throughout the 72 hr reaction period. The product was precipitated by addition of ten volumes of methanol. After two more precipitations from THF-methanol and drying in vacuo, 100 mg of brick-red solid was obtained. This material exhibited new bands in the infrared at 3030, 1600, and 100 $cm^{-1}$ consistent with partial desilation to give a PTMSA-acetylene copolymer.

EXAMPLE 3

C-bonded silyl groups are widely utilized in synthetic organic chemistry for their ability to stabilize charges α (anions) and β (cations) to the silicon atom, to undergo ipso replacement reactions and to function as protecting groups for acetylenes. (See, e.g., Fleming "*Comprehensive Organic Chemistry*," Vol. 3, Bargon, et al., Eds. Pergammon Press, Oxford, 1979, 541–686, whose disclosure is incorporated by reference herein). It has been found that silyl groups of the polymers of this invention are subject to replacement with groups such as hydrogen or acetyl, etc., to give copolymers of TMSA with acetylene and acetylacetylene, respectively. Nucleophilic partial desilation was accomplished by treatment of a THF solution of PTMSA with $Et_4N^+F^-$ at room temperature to give soluble TMSA-acetylene copolymer. The new bands in the infrared at 3030, 1600 and 1000 $cm^{-1}$ were characteristic of polyacetylene and showed that the expected desilation had occurred. This method has a major advantage over the desilation method used by Okano, et al. in that the desilated product is soluble and tractable over a wide range of degrees of desilation and the amount of desilation could be varied from a few percent to >90% by judicious choice of reaction conditions, as discussed above. The resulting polymers have higher conductivities than PTMSA or any other polyacetylene derivative known.

EXAMPLE 4

Electrophilic replacement of the silyl functions in PTMSA with acetyl groups was also performed using $AcCl/TiCl_4/CH_2Cl_2$, $-84°$ C. Under these conditions, 50% of the silyl groups were replaced. A similar replacement was achieved using benzoyl chloride to produce the novel polyacetylene copolymer, poly(benzoylacetylene/trimethylsilylacetylene). Similarly utilizing $CF_3OF$, the novel polymer poly(fluoroacetylene) was prepared.

TABLE 1
TMSA Polymerization by Mixtures of $WCl_6$ and Organometallics

| Composition | T (hr)$^a$ | Yield (%)$^b$ | % Soluble | $M_{n3}{}^c$ |
|---|---|---|---|---|
| $WCl_6 \cdot 1\underline{n}\text{-BuLi}$ | 24 | 43 | 83 | $9 \times 10^3$ |
| $WCl_6 \cdot 2\underline{n}\text{-BuLi}$ | 24 | 49 | 32 | $1.1 \times 10^4$ |
| $WCl_6 \cdot 3\underline{n}\text{-BuLi}$ | 18 | 86 | 8 | — |
| $WCl_6 \cdot 4\underline{n}\text{-BuLi}$ | 24 | 100 | 4 | $2.5 \times 10^5$ |
| $WCl_6 \cdot 5\underline{n}\text{-BuLi}$ | 24 | 9 | 0 | — |
| $WCl_6 \cdot 6\underline{n}\text{-BuLi}$ | 24(60°)$^d$ | 100 | 0 | — |
| $WCl_6 \cdot 2MeMgBr$ | 24 | 50 | 100 | $9 \times 10^3$ |
| $WCl_6 \cdot 2PhLi$ | 24 | 66 | 44 | $1 \times 10^4$ |
| $WCl_6 \cdot 2\underline{n}\text{-BuLi}$ | 18$^e$ | 40 | 100 | $4 \times 10^3$ |
| $WCl_6 \cdot 1PhLi$ | 16$^f$ | 77 | 30 | $5 \times 10^4$ |
| $WCl_6 \cdot Ph_4Sn^g$ | 22 | 55 | 25 | $1.8 \times 10^4$ |
| $W(CO)_6/CCl_4/hv^g$ | 22 | 57 | 25 | $2.5 \times 10^4$ |

$^a$Reaction conditions except where noted: $(TMSA)_o = 1 \underline{M}$ in toluene. (Cat) = 0.03 $\underline{M}$, T = 23° C.
$^b$As isolated by MeOH precipitation
$^c$Modal $M_n$ from GPC relative to polystyrene standards
$^d$No apparent reaction at 23° C.
$^e Et_2O$ solvent
$^f$Inverse addition
$^g$Prior art catalyst

EXAMPLE 6

$I_2$-doped PTMSA of an ultimate conductivity of about $10^{-4}$ S/cm was achieved by conventional doping. This is slightly higher than most substituted polyacetylenes, but at the doping level required to achieve this value, the iodine was quite labile, desorbing readily at atmospheric pressure. Essentially all of the dopant could be removed from the PTMSA pellets by pumping overnight. The pellets return almost to their undoped conductivity after pumping. Desilation of PTMSA with fluoride gave copolymers of higher conductivity. Removal of 5% of the silyl groups increased conductivity ten-fold. The solubility of the resulting copolymers, combined with their increased conductivities established their utility in the applications mentioned herein.

EXAMPLE 7

Poly(trimethylsilylacetylene)

$(W(CO)_6/(PhMeSi)_n/h\nu$ catalysis).

A solution of $W(CO)_6$ (40 mg, 0.11 mmol), purified $(PhMeSi)_n$ oligomers (272 mg, 2.27 mmol), and trimethylsilylacetylene (TMSA, 700 mg, 7.12 mmol) in 5 ml dry, deoxygenated benzene was irradiated under $N_2$ in a Rayonet photochemical reactor equipped with 3500 Å lamps. After 18 hrs, the solution had gelled to a completely solid mass. This was converted to a stirrable slurry by addition of 30 ml $CCl_4$. Solid polymer was isolated by filtration to provide 360 mg of lemon yellow PTMSA. The infrared spectrum of this material was identical to that of PTMSA prepared using the $WCl_6 \cdot nRM$ catalysts, with the exception of small additional absorptions at 1158, 1013, and 928 $cm^{-1}$ attributable to slight contamination with the $(PhMeSi)_n$ cocatalyst.

EXAMPLE 8

Poly(trimethylsilylacetylene)

$(WCl_6/PhMeSi_n$ Catalysis)

Purified $(PhMeSi)_n$ oligomers (364 mg, 2.89 mmol) were dissolved in 7 ml of toluene. Upon addition of 95 mg $WCl_6$ (0.26 mmol) to this solution, the deep blue color of the $WCl_6$ was immediately discharged and a rust red color formed. The resulting mixture was allowed to stir for 30 min. and 700 mg TMSA (7.12 mmol) then added by syringe. After stirring for 24 hrs at ambient temperature, the polymer product was isolated by precipitation with 8 volumes of MeOH followed by filtration. To remove traces of $(PhMeSi)_n$ cocatalyst, the crude polymer was slurried in 50 ml warm hexanes, the slurry centrifuged, and the hexane supernatant discarded. After drying, 360 mg PTMSA was obtained with IR identical to PTMSA prepared using the $WCl_6 \cdot nRM$ catalysts and a GPC-determined Mw of 23700.

EXAMPLE 9

Polymerization of TMSA in tetrahydrofuran (THF).

A solution of $WCl_6$ (95.2 mg, 0.26 mmol) was prepared in 7 ml dry, deoxygenated THF and immediately treated with 0.37 ml (0.53 mmol) of n-BuLi solution in hexane. After stirring the resulting mixture for 30 min. at ambient temperature, neat TMSA (700 mg, 7.12 mmol) was added by syringe. After further stirring for 24 hrs, crude polymer was precipitated from this mixture by addition of 8 volumes of methanol. After reprecipitation from THF with methanol, 300 mg of lemon yellow soluble polymer was obtained. Surprisingly, the infrared of this material showed absorptions in the 1370–1480 $cm^{-1}$ and 1050–1150 $cm^{-1}$ regions not found in authentic PTMSA attributable to THF-derived moieties. The NMR spectrum confirmed this, exhibiting strong, broad absorptions centered at 1.6 ppm and 3.4 ppm superimposed on the usual PTMSA spectrum. Two rationalizations can be given for these observations: (1) the PTMSA is admixed with poly-THF or (2) THF moieties have been grafted onto the PTMSA backbone by silyl replacement during polymerization. Although a rigorous distinction between these two possibilities has not been made, the fact that two further THF/MeOH precipitations had no effect on the ratio of the NMR integrals of the 3.4 ppm (THF-derived) absorption and the 0.2 ppm absorption (PTMSA-SiMe groups) suggests the latter explanation to be most likely. This (assumed) TMSA-4-hydroxybutylacetylene copolymer is a better film former than PTMSA and, being more polar, adheres to surfaces better.

EXAMPLE 10

Bromination of Soluble and Insoluble PTMSA and Nature of Insoluble Fraction.

Samples of insoluble and soluble PTMSA fractions (50 mg each) from a single PTMSA preparation using $WCl_6 \cdot PhLi$ as catalyst were separately slurried (or dissolved) in 20 ml $CCl_4$. Each solution was then separately treated with 0.0895 g (1.1 eq) of elemental bromine. After stirring both mixtures for 30 min. at ambient temperature, it was noted that the insoluble fraction had been completely solubilized. After stirring for a further 18 hrs at room temperature, excess aqueous $NaHSO_3$ solution was added to both solutions to destroy any unreacted bromine. The $CCl_4$ layers were then separated, dried over $CaSO_4$, and stripped to dryness. NMR and IR spectra of the resulting brominated insoluble and soluble PTMSA fractions were nearly identical. GPC determination showed that the molecular weight distributions of the two fractions were, within experimental error, identical. These experiments demonstrate that, for at least some of the synthetic modifications of soluble PTMSA described in the examples, insoluble PTMSA can be utilized with equal facility since it is solubilized by the modification reaction. This means that essentially all of the PTMSA generated by the polymerization of TMSA is potentially usable in at least some derivatization reactions.

These experiments also indicate that the insoluble PTMSA is not insoluble by virtue of cross-linking, since this crosslinking would be unaffected by the bromination reaction. The GPC molecular weight distributions indicate that there is no significant difference in molecular weight between the soluble and insoluble fractions. It, therefore, appears most likely that the insolubility of this fraction is due to a greater relative number of E double bonds in its backbone than the soluble fraction.

EXAMPLE 11

Partial Replacement of PTMSA Silyl Groups with Fluorine.

A solution of PTMSA (300 mg, 3.05 meq) in 50 ml dry, deoxygenated $CH_2Cl_2$ was cooled to $-78°$ under an argon atmosphere. Gaseous $CF_3OF$ diluted with Ar was then bubbled through the solution at such a rate that the temperature of the solution did not rise above $-60°$ C. The PTMSA solution immediately turned dark green upon introduction of the $CF_3OF/Ar$ mixture and the color became progressively darker as reaction proceeded. After 10 min., the $CF_3OF$ flow was stopped and pure Ar bubbled through the mixture as it was allowed to warm to ambient temperature. Excess aqueous Na solution was then added and the mixture allowed to stir vigorously for 20 min. to destroy any unreacted $CF_3OF$. The layers were then separated and 5 volumes methanol added to the $CH_2Cl_2$ phase to precipitate the crude product (120 mg). A further precipitation from $CDCl_3$ with methanol gave 73 mg of purified fluoroacetylene/trimethylsilylacetylene copolymer. The IR spectrum of this material exhibited strong new absorption in the 1200–1000 cm$^{-1}$ region attributable to C—F bonds and a strong shift in the C=C stretch from 1570 cm$^{-1}$ in PTMSA to 1620 and 1700 cm$^{-1}$ in the copolymer, consistent with C=C stretching from $Me_3Si$ substituted olefinic linkages α to fluorine-substituted olefinic linkages and fluorine-bearing C=C bonds, respectively. Microanalysis: Found C 50.18; H 5.98; Si 15.20; F 20.20 (cf. PTMSA: C 61.21; H 10.28; Si 28.63).

EXAMPLE 12

Metallation of Bromine-Replaced PTMSA.

A solution of 0.4 g bromoacetylene-trimethylsilylacetylene copolymer (prepared by bromination of PTMSA according to Example 10) in 25 ml THF was cooled to $-45°$ C. and 2.91 ml of 1.4M sec-BuLi in cyclohexane (40.7 mmol) added dropwise with stirring. After a further 30 min. of stirring, dry, benzoic acid-free benzaldehyde (0.414 ml, 40.7 mmol) was added in a single portion and the mixture allowed to warm to ambient temperature. The crude product (0.2 g) was obtained by precipitation with 5 volumes methanol. After drying, it exhibited the expected IR and NMR spectra. This example illustrates the technique of sequential modifications of the basic PTMSA structure. It also provides a means for generating stable, trappable vinylic lithium bonds on the PTMSA conjugated backbone, thereby opening up an additional wide range of structural modifications.

EXAMPLE 13

Addition of ICl to PTMSA.

A solution of 200 mg (2.04 meq) of PTMSA in 4 ml $CCl_4$ was treated with 363 mg (2.24 mmol) ICl. A vigorous reaction occurred. After 20 hrs stirring at room temperature, a large amount of black precipitate had formed. The remainder of the product was precipitated by addition of 10 volumes methanol, isolated by filtration, washed thoroughly with more methanol, then dried. Microanalysis gave: Found, C 47.52; H 3.52; Si 2.96; I 29.04; Cl 15.47. The microanalysis results suggest that, in this case, both silyl replacement by I and addition of ICl across the backbone have occurred. This backbone addition is undesirable since it lowers the conductivity of the resulting materials. However, a subsequent treatment with a tertiary amine (triethylamine, diazabicycloundecene, etc.) can be used to eliminate the elements of HX (X=F, Cl, Br, I) and, thereby, reestablish the PTMSA backbone of alternating single and double bonds.

EXAMPLE 14

Doping and Conductivity of PTMSA and Derived Copolymers.

PTMSA and materials derived from it by the synthetic manipulations described in the previous examples can be doped by either vapor-phase or solution methods which are known to those skilled in the art. Suitable dopants will include electron acceptors ($I_2$, $AsF_5$, FeCl₃ and the like) or donors (alkali metals, Li benzophenone, Na naphthalenide, etc.). The following procedure is illustrative of vapor phase doping techniques: PTMSA (7 mg) was compacted by means of a handpress into pellets 3 mm in diameter by 1 mm in thickness. Doping was accomplished by exposure of these pellets to I₂ vapor in an otherwise inert atmosphere for varying periods of time depending on the level of doping desired. This brings about a rapid change in color from the lemon yellow of undoped PTMSA to a metallic black characteristic of the doped material. Doping levels were determined gravimetrically on an electronic microbalance. Conductivities were measured by a standard four-probe apparatus.

EXAMPLE 15

Polymerization of Phenylacetylene with WCl 4n-BuLi

A dry, degassed toluene solution of 0.0925 g WCl₆ was treated with 4 eq. of 2.1 n-BuLi solution in hexane. The resulting catalyst solution was stirred for 30 min. at ambient temperature whereupon 0.79 ml of purified phenylacetylene was added by syringe. The resulting mixture was stirred at room temperature for 18 hours. The reaction was then quenched by addition of 8 volumes methanol. The precipitated product was isolated by filtration, washed well with methanol and dried in vacuo to afford 0.5 g (70% yield) of deep red poly(phenylacetylene). Gel permeation chromatography showed this material to have a "polystyrene equivalent" molecular weight of 250,000 in a monomodal molecular weight distribution. Infrared and NMR spectroscopy and elemental analysis results were all consistent with the assigned structure.

EXAMPLE 16

Several other representative substitued acetylenes were polymerized by a procedure identical to that in Example 1. The yields and molecular weights (for the soluble polymers) are shown in Table 2 below. It is noteworthy that acetylenes with coordinating substituents are polymerized by this catalyst.

TABLE 2

Polymerization of Substituted Acetylenes by WCl₆.4 n-BuLi

| Acetylene | Yield | Modal MW |
|---|---|---|
| 1, 5-hexadiyne | 50 | insoluble |
| 2-ethynylpyridine | 17 | 20000 |
| propargyl chloride | 30 | 4000 |
| 1-phenyl propiolic acid | 25 | 10000 |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A soluble polymer or copolymer having —C(R)=C(R)₄— as a majority of repeating structural units and a molecular weight $(M_n) \geq$ about 10,000, said polymer or copolymer being the product of the polymerization of acetylenic monomers at a temperature within the range of −10° to 150° C. in an inert atmosphere and in the presence of a tungsten (III or IV) compound and a cocatalyst selected from the group consisting of organolithium compounds, organomagnesium compounds, polysilanes, and compounds containing a Si—Si, P—P, S—S, Ge—Ge, As—As, Sn—Sn, Sb—Sb, or Te—Te bond, said acetylenic monomers having the formula R—C(R)=C(R)₄, wherein R is R₁R₂R₃Si, in which each R¹, R₂, and R₃ is C₁₋₄—(n- or sec-)alkyl, C₂₋₄-alkenyl, C₆₋₁₄-aryl, C₇₋₁₇ heteroaryl, C₇₋₁₇-alkaryl, C₇₋₁₇-aralkyl, C₃₋₁₂-cycloalkyl, C₂₋₄-(n- or sec-)-alkyl wherein one CH₂ group is replaced by —O—, —S—, —COO—, or —OOC—; H, or groups recited for R₁, R₂, and R₃; R₄ is H or one of the groups recited for R₁, R₂, and R₃ except C₂₋₄-alkenyl, with the provisos that R and R₄ must not both be H at the same time and that the combination of R and R₄ be sterically compatible with said polymerization.

2. A polymer of claim 1 having $(\overline{M}_n) \geq$ about 30,000.

3. Polytrimethylsilylacetylene having a molecular weight $(\overline{M}_n) \geq$ about 10,000, a polymer of claim 1.

4. Polytrimethylsilylacetylene having a molecular weight $(\overline{M}_n) \geq$ about 30,000, a polymer of claim 2.

5. A polymer of claim 2 which is a homopolymer.

6. The polymer or copolymer of claim 1, wherein the tungsten compound used is WCl₆.

* * * * *